Patented Aug. 21, 1928.

1,681,602

UNITED STATES PATENT OFFICE.

HERMANN WAGNER, OF SODEN, AND OTTO SOHST, OF HOCHST-ON-THE-MAIN, GERMANY, ASSIGNORS, BY MESNE ASSIGNMENTS, TO GRASSELLI DYESTUFF CORPORATION, OF NEW YORK, N. Y., A CORPORATION OF DELAWARE.

AZO DYESTUFFS AND PROCESS OF MAKING SAME.

No Drawing. Application filed March 12, 1925, Serial No. 15,121, and in Germany March 29, 1924.

We have found that by coupling the hitherto unknown 2-amino-4-aroylamino-1-alkyloxy- aryloxy- or aralkyloxy-benzenes (obtainable by the action of aroylchlorides upon 2-nitro-4-amino-1-alkyloxy- aryloxy- for aralkyloxy-benzenes and subsequent reduction) with any 2.3 hydroxynaphthoic acid arylides, beautiful claret-red dyeings of excellent fastness to light and kier-boiling are produced. Fast dyeings in such shades could hitherto not at all be obtained by means of monoazo dyestuffs.

In our new process there may, for instance, be used with advantage the 2-amino-4-benzoyl-amino-1-anisol which melts at 139°. Similar dyestuffs may be obtained by using instead of benzoylchloride its homologues or substitution products, such for instance as chlorbenzoylchloride, alkyloxy-benzoylchloride or the like, for the preparation of the body to be employed as the diazo component or by substituting for the methoxy group the ethoxy-, benzyloxy- or phenoxy group.

The new dyestuffs may be produced both on the fibre and in substance in presence or absence of a substratum. When produced in substance, they form claret-red powders, those prepared by means of phenyl-ethers having a somewhat redder hue than the others. They dissolve in sulfuric acid of 66° Bé. to an intense bluishviolet solution.

The following examples serve to illustrate our invention more fully, but are not intended to limit the same:

1. 242 parts of 2-amino-4-benzoylamino-1-anisol are diazotized in the usual manner in a hydrochloride solution with 70 parts of nitrite and the diazo-solution so obtained is coupled with an alkaline solution of 2.3-hydroxynaphthoic acid-5-chloro-o-anisidide $$NH:OCH_3:Cl=1:2:5,$$

with or without adding a substratum such for instance as heavy spar (barium sulfate). The dark-red precipitate is filtered off, washed and dried. The resulting dyestuff has most probably the formula:

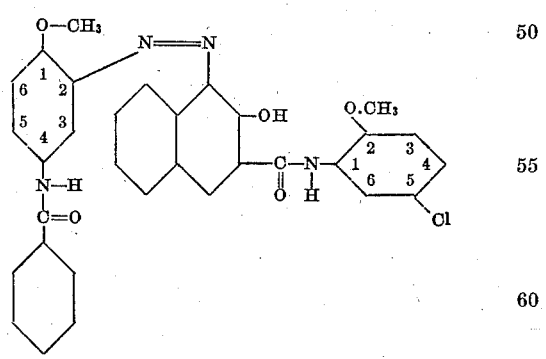

If the 2.3-hydroxynaphthoic acid-5-chloro-o-anisidide used in the preceding example is replaced by the 2.3-hydroxynaphthoic acid-β-naphthylamide, a quite similar dyestuff is obtained, whereas when using 2.3-hydroxynaphthoic acid-α-naphthylamide a dyestuff of a more bluish hue results.

2. Cotton yarn, after being boiled and dried, is well impregnated with an aqueous grounding liquor containing, in 1 liter, 11.85 gr. of 2.3-hydroxynaphthoic acid-4-chloro-2-toluidide (NH:CH$_3$:Cl=1:2:4), 30 ccm. of 34° Bé. caustic soda solution, and 40 ccm. of sodium turkey red oil (of 50% strength). Thereafter the yarn is wound off, and dyed with a diazo solution prepared as follows:

4.84 gr. of 2-amino-4-benzoylamino-1-anisol are dissolved in 50 ccm. of hot water and 5.2 ccm. of hydrochloric acid (22° Bé.). The resulting solution is cooled by the addition of 50 gr. of ice, and the cooled solution is mixed with a solution of 1.44 gr. of sodium nitrite in 10 ccm. of water. The whole is then made up with water to 1 liter and, before use, is neutralized with 4 gr. of sodium acetate.

The resulting dyed yarn is wound off, well washed, and soaped while boiling.

In this way a bright claret-red shade with a blue hue of excellent fastness to washing and kier-boiling is obtained. The dyestuff thus produced has the probable formula:

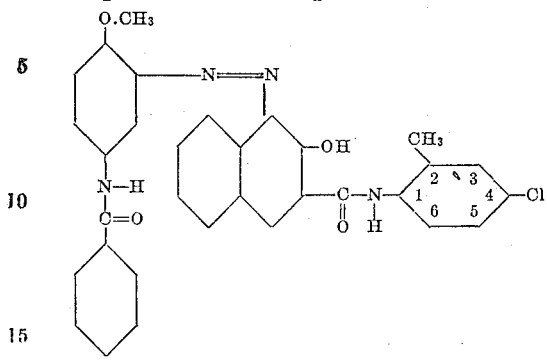

If for the 2.3-hydroxynaphthoic acid-4-chloro-2-toluidide is substituted 2.3-hydroxynaphthoic acid-5-chloro-2-anisidide $NH:OCH_3:Cl = 1:2:5$ a claret-red shade of a still more bluish hue is obtained.

3. Material is padded with an aqueous solution containing, in 1 liter, 24.2 gr. of 2.3-hydroxynaphthoic acid-5-chloro-2-anisidide

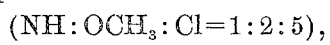

20 gr. of para soap P. N., and 80 ccm. of 22° Bé. caustic soda solution. The padded material is dried, and thereafter printed with a dye composition prepared as follows:

24.2 gr. of 2-amino-4-benzoylamino-1-anisol are made into a paste with 140 ccm. of water and 24 ccm. of hydrochloric acid (22° Bé.); the resulting paste is cooled by the addition of 150 gr. of ice, and there is added thereto a solution of 8 gr. of sodium nitrite dissolved in 50 ccm. of water; the resulting mixture is introduced, with stirring, into 524 gr. of tragacanth 60:1000, and thereafter there are added 60 gr. of aluminum sulfate 1:1 dissolved in water. Before use, there are added to the composition 20 gr. of sodium phosphate.

Thus a bright claret-red shade is obtained which resists very well the action of soap, sodium carbonate and alkalies. The dyestuff has the probable formula:

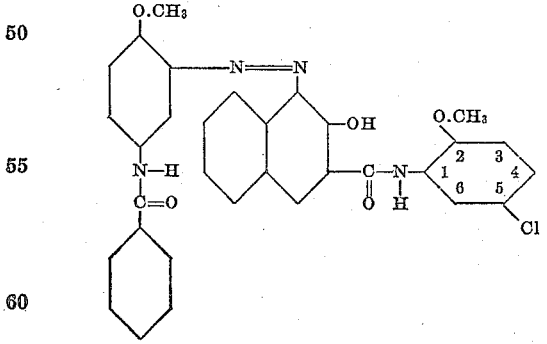

If in the foregoing examples the 2-amino-4-benzoylamino-1-methoxybenzene is replaced for instance by:

2-amino-4-benzoylamino-1-ethoxybenzene 2-amino-4-benzoylamino-1-benzyloxybenzene or 2-amino-4-benzoylamino-1-phenoxybenzene or by the derivatives of these compounds substituted in the benzoyl group, quite similar dyestuffs are obtained.

Dyestuffs which give in general a somewhat more bluish hue are produced if the 2.3-hydroxynaphthoic acid -4-chloro-2-toluidide as used in Example 2 is for instance replaced by equivalent quantities of 2.3-hydroxynaphthoic acid-p-anisidide 2.3-hydroxynaphthoic acid-2-chloro-4-anisidide ($Cl:NH:OCH_3 = 2:4:1$)

2.3-hydroxynaphthoic acid-3-chloro-4-anisidide ($Cl:NH:OCH_3 = 3:4:1$)

2.3-hydroxynaphthoic acid-3-nitro-4-anisidide ($NO_2:NH:OCH_3 = 3:4:1$)

2.3-hydroxynaphthoic acid-2-phenoxy-1-anilide 2.3-hydroxynaphthoic acid-4-phenoxy-1-anilide 2.3-hydroxynaphthoic acid-4-benzyloxy-1-anilide 2.3-hydroxynaphthoic acid-α-naphthylamide or 2.3-hydroxynaphthoic acid-β-naphthylamide.

The last mentioned body gives a claret-red tint of a more reddish hue.

We claim:

1. The process of producing azo dyestuffs, consisting in coupling arylamides of 2-hydroxynaphthalene-3-carboxylic acid with diazotized bases of the following constitution:

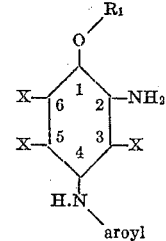

wherein X represents hydrogen or a substituent, $R_1$ an alkyl-group, aryl group or aralkyl group.

2. Process of producing azo dyestuffs, consisting in coupling arylamides of 2-hydroxynaphthalene-3-carboxylic acid with diazotized 2-amino-4-benzoylamino-1-methoxybenzene.

3. Process of producing azo dyestuffs, consisting in coupling 2.3-hydroxynaphthoic acid-5-chloro-2-methoxy-1-anilide of the following constitution:

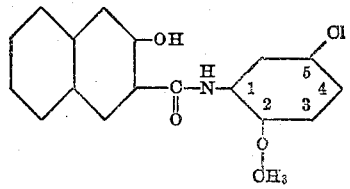

with diazotized bases of the following constitution:

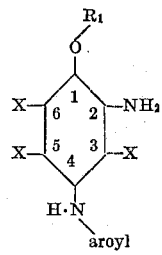

wherein X represents hydrogen or a substituent, $R_1$ an alkyl-group, aryl group or aralkyl group.

4. As new products, azo dyestuffs of the following formula:

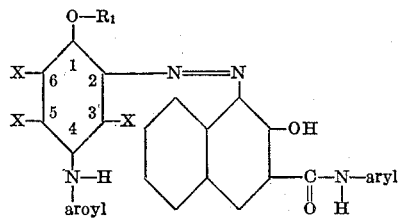

wherein X represents hydrogen or a substituent, $R_1$ an alkyl group, aryl group or aralkyl group, being claret-red powders, insoluble in water, soluble in concentrated sulfuric acid with an intense blue-violet color, the coloring matters, when produced on the fibre, giving claret-red tints of good fastness to light and to kier-boiling.

5. As new products, azo dyestuffs of the following formula:

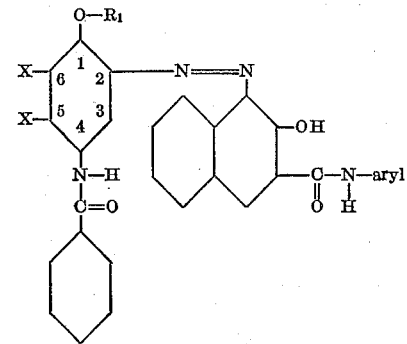

wherein X represents hydrogen or a substituent and $R_1$ an alkyl- aryl- or aralkyl group, being claret-red powders, insoluble in water, soluble in concentrated sulfuric acid with an intense blue-violet color, the coloring matters, when produced on the fibre, giving claret-red tints of good fastness to light and kier-boiling.

6. Process for the production of a new azo dyestuff which comprises coupling 2-hydroxynaphthalene - 3 - carboxylic acid-5-chloro-2-methoxy-1-anilide of the formula:

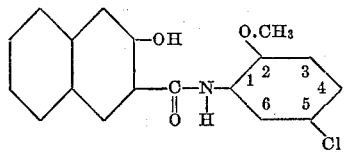

with diazotized 2-amino-4-benzoylamino-1-methoxy-benzene.

7. As new products, azo dyestuffs having the general formula:

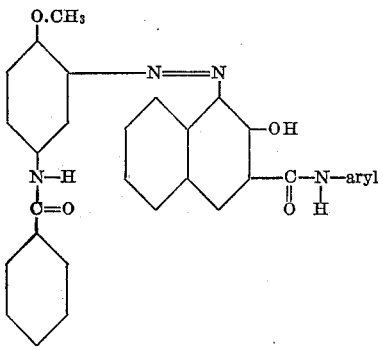

being, in the dry powdered state, claret-red powders insoluble in water, soluble in concentrated sulfuric acid with an intense blue-violet color, the dyestuffs, when produced on the fiber, giving claret-red tints of good fastness to light and to kier-boiling.

8. As a new product the azo dyestuff having the probable formula:

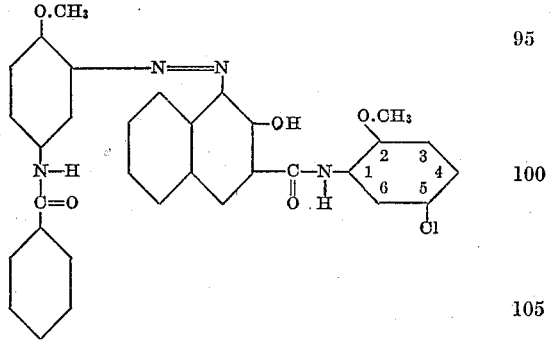

In testimony whereof, we affix our signatures.

Dr. HERMANN WAGNER.
Dr. OTTO SOHST.

CERTIFICATE OF CORRECTION.

Patent No. 1,681,602.                                            Granted August 21, 1928, to

HERMANN WAGNER ET AL.

It is hereby certified that error appears in the printed specification of the above numbered patent requiring correction as follows: Page 1, line 5, for the word "for" read "or"; and that the said Letters Patent should be read with this correction therein that the same may conform to the record of the case in the Patent Office.

Signed and sealed this 8th day of January, A. D. 1929.

(Seal)                                                      M. J. Moore,
                                                             Acting Commissioner of Patents.